United States Patent [19]

Noel, Jr. et al.

[11] Patent Number: 5,581,710
[45] Date of Patent: Dec. 3, 1996

[54] FULL DUPLEX COMMUNICATION ON A SINGLE COMMUNICATION RING

[75] Inventors: Francis E. Noel, Jr., Durham; Kenneth D. Schultz; Thomas E. Stammely, both of Cary, all of N.C.

[73] Assignee: International Business Machines Corporation, Armonk, N.Y.

[21] Appl. No.: 554,800

[22] Filed: Nov. 7, 1995

Related U.S. Application Data

[63] Continuation of Ser. No. 130,979, Oct. 4, 1993, abandoned.

[51] Int. Cl.⁶ ................................................. H01J 13/00
[52] U.S. Cl. ........................... 395/200.21; 340/825.05; 370/276
[58] Field of Search .................. 395/200.21; 370/16, 370/16.1; 340/825.05

[56] References Cited

U.S. PATENT DOCUMENTS

| | | | |
|---|---|---|---|
| 4,186,380 | 1/1980 | Edwin et al. | 395/182.02 |
| 4,228,403 | 10/1980 | Okumura et al. | 328/84 |
| 4,304,001 | 12/1981 | Cope | 395/182.02 |
| 4,506,357 | 3/1985 | Nakayashiki et al. | 370/16 |
| 4,534,027 | 8/1985 | Perry | 395/182.02 |
| 4,654,844 | 3/1987 | Mandello | 370/32 |
| 4,663,748 | 5/1987 | Karbowiak et al. | 370/89 |
| 4,701,630 | 10/1987 | Annunziata et al. | 307/112 |
| 4,707,673 | 11/1987 | Lee et al. | 333/112 |
| 4,752,924 | 6/1988 | Darnell et al. | 378/86 |
| 4,882,580 | 11/1989 | Teranishi et al. | 340/825.51 |
| 4,885,747 | 12/1989 | Eoglia | 376/123 |
| 4,905,230 | 2/1990 | Madge et al. | 370/85.5 |
| 4,933,668 | 6/1990 | Oyer et al. | 340/541 |
| 4,985,892 | 1/1991 | Camarata | 370/123 |
| 4,998,079 | 3/1991 | Theall, Jr. | 333/112 |
| 5,003,531 | 3/1991 | Farinholt et al. | 370/16.1 |
| 5,008,870 | 4/1991 | Vessa | 368/242 |
| 5,049,871 | 9/1991 | Sturgis et al. | 340/825.25 |
| 5,063,371 | 11/1991 | Oyer et al. | 340/541 |
| 5,199,025 | 3/1993 | Miwa | 370/16.1 |
| 5,301,208 | 4/1994 | Rhodes | 375/36 |

*Primary Examiner*—Mehmet B. Geckil
*Assistant Examiner*—Robert E. Stachler, II
*Attorney, Agent, or Firm*—Joscelyn G. Cockburn; Homer L. Knearl; Francis A. Sirr

[57] ABSTRACT

A ring network of workstations interconnected on a single simplex ring is converted to duplex communications on the single ring by placing two transceivers in each workstation and adding a duplex conversion device between each workstation and its ring terminal box. One of the transceivers receives and retransmits signals in a clockwise direction around the ring; the other transceiver receives and retransmits signals in a counter-clockwise direction around the ring. The clockwise and counter-clockwise signals are superimposed on the ring but are isolated at the workstations by the duplex conversion device.

5 Claims, 3 Drawing Sheets

FULL DUPLEX COMMUNICATION ON A SINGLE COMMUNICATION RING

This application is a continuation of patent application Ser. No. 08/130,979 filed Oct. 4, 1993, now abandoned.

BACKGROUND OF THE INVENTION

1. Field of the Invention

This invention is directed to a method and apparatus for providing full duplex communication on existing simplex ring communication networks.

2. Description of Prior Art

Ring communication networks in computing systems, and particularly twisted-pair wire communication networks, have been one-way ring communication systems with computer work stations acting as communication relay stations around the ring. FIG. 1 shows a typical simplex communication system using twisted-pair wire between each workstation in a ring. By way of example, three workstations 10, 12 and 14 are shown connected to Token Ring network through IBM 8228 terminal boxes 16, 18 and 20 (also known as Padre boxes). The twisted-pair wire links 22, 24 and 26 between Padre boxes 16, 18 and 20 complete the ring.

Simplex communication around the ring moves counter-clockwise; i.e., workstation 10 to workstation 12 to workstation 14 and back to workstation 10. At terminal box 16, the signal is received at a first set of coils 28 where the signal is inductively coupled to a twisted-pair wire link 30 to workstation 10. Transceiver 32 (for example, a Token Ring adapter card) receives the signals over link 30 and reads the destination address in the message. If the message is to be delivered to workstation 10, it is passed to the workstation's processor. If the message is not addressed to workstation 10, transceiver 32 retransmits the signal out on twisted-pair wire link 34 at full power to a second set of coils 36 in terminal box 16. The signal is inductively coupled across coils 36 to link 22 for passage to terminal box 18 and workstation 12. In this manner, the communication signal from any one workstation will travel around the ring to reach any other workstation on the ring to which the signal is addressed.

There are a very large number of simplex ring communication networks, such as the example in FIG. 1 currently installed in data processing offices. It would be a significant enhancement to all of these installed systems if the systems could be converted to full duplex communication operations without rewiring the communication links and the terminal boxes. In such a duplex ring, communication signals would independently counter-rotate around the single ring between workstations.

Double-ring communication systems, with each station connected to both rings and signals rotating in one direction on each ring and in opposite directions on the two rings, are well known. Exemplary of such systems are the networks and stations taught in U.S. Pat. No. 4,663,748, entitled "Local Area Network," U.S. Pat. No. 4,752,924, entitled "Ring Packet Switch," and U.S. Pat. No. 5,049,871, entitled "Loop Communication System." None of these patents teach a single ring with duplex communication.

Another technique for increasing the signal carrying capacity on a twisted-pair wire ring is to use frequency couplers, or filters, in the ring to separate signals at different frequencies. An example of such a communication system is described in U.S. Pat. No. 4,885,747, entitled "Broadband and Baseband LAN." This does increase the throughput of the ring, but communications on the ring are still simplex.

SUMMARY OF THE INVENTION

It is an object of this invention to increase the signal capacity and versatility of a ring communication system.

It is a further object of this invention to provide duplex communications in a conventional simplex ring communication system without altering the communication links and terminal boxes in the system.

In accordance with this invention, the above objects have been accomplished in a ring network of workstations by placing two transceivers in each workstation and adding a duplex conversion, or signal exchange, device between each workstation and its ring terminal box. One of the transceivers receives and retransmits signals in a clockwise direction around the ring; the other transceiver receives and retransmits signals in a counter-clockwise direction around the ring. The conversion device is constructed so as to pass signals between the ring and each of the transceivers, while isolating signals between one of the transceivers and the terminal box from signals between the other of the transceivers and the terminal box. In this way, the clockwise and counter-clockwise signals are superimposed on the ring, but are isolated at the workstations.

The great advantage of the invention is that the transmission capacity of the ring communication network is doubled and, in addition, the communication is now duplex rather than simplex. Further, this is accomplished without rewiring the terminal boxes or the ring links between terminal boxes. Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 2:
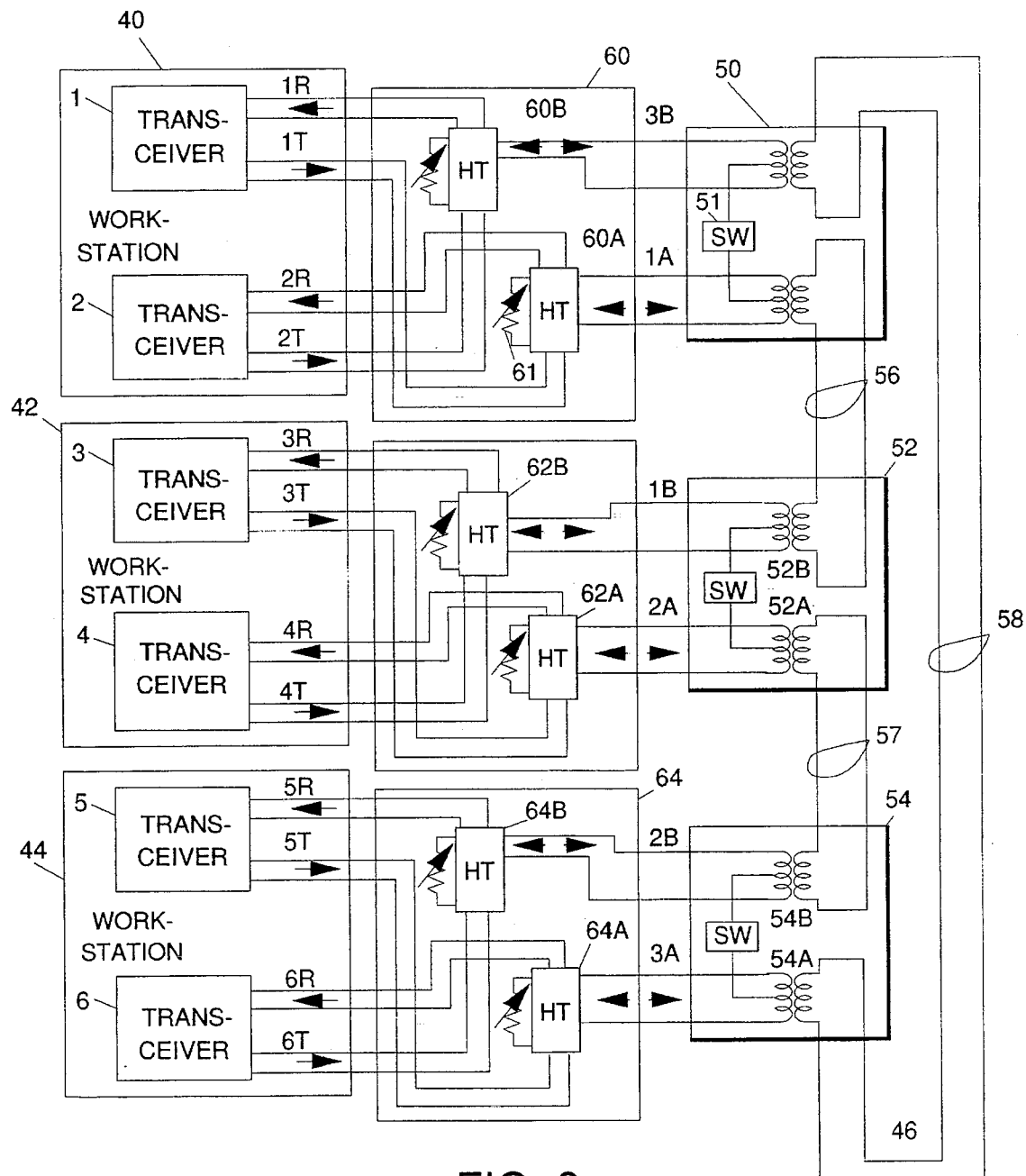
FIG. 2 shows the preferred embodiment of the invention with two transceivers and a duplex converter at each workstation.

The preferred embodiment of invention, as shown in FIG. 2, has two transceivers in each of the workstations and a duplex converter between each workstation and the terminal box. In the exemplary system of FIG. 2, there are three workstations 40, 42 and 44 connected on the ring 46 via three terminal boxes 50, 52 and 54. Ring 46 is a closed loop having three links, 56, 57 and 58 connecting the terminal boxes in series around the ring. In one preferred embodiment, the ring is an IBM Token Ring network, each of the links 56, 57 and 58 are shielded twisted-pair wires, or cable, and each of the terminal boxes 50, 52 and 54 is a Padre box (IBM 8228 terminal box). While the Token Ring network is the most common implementation of the invention, it will be appreciated by one skilled in the art that the invention applies to any ring network whether implemented in analog or digital mode with electronic or optical elements.

Figure 1:
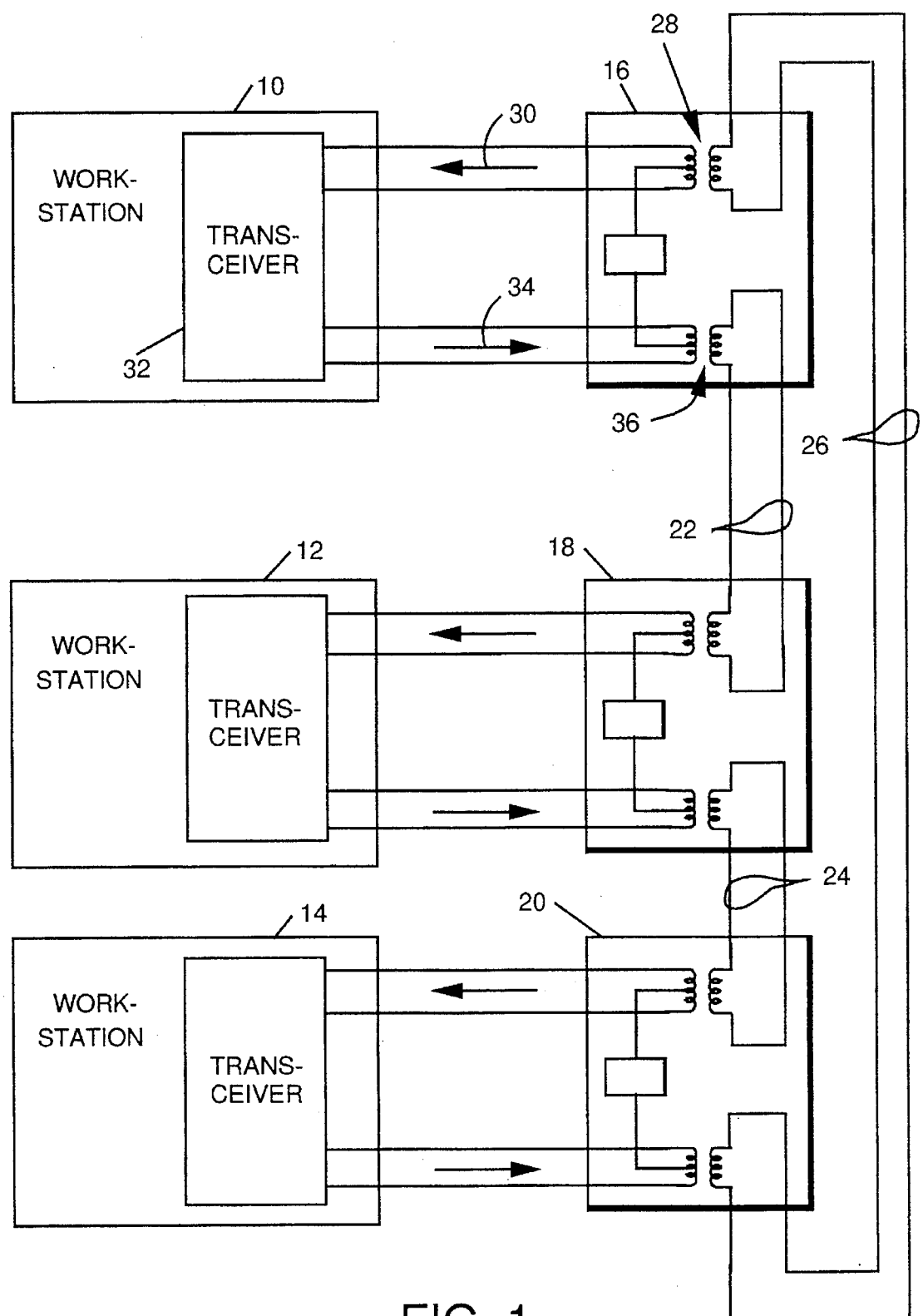
FIG. 1 shows a typical prior art computing system having three workstations and a simplex ring communication network.

In the exemplary Token Ring embodiment of the invention, the transceivers 1 and 2, 3 and 4, 5 and 6 in each workstation 40, 42 and 44, respectively, are Token Ring adapter cards. Accordingly, each transceiver has a microprocessor that logically operates on a received signal and either passes the received signal to the workstation processor or retransmits the signal around the ring. In effect, each transceiver, or Token Ring adapter, operates in the same manner as it did in the prior art depicted in FIG. 1. However, now there are two adapter cards at each station, and one card is sending signals clockwise around ring 46 while the other is sending signals counter-clockwise around the ring.

Also in the Token Ring embodiment, each of the terminal boxes 50, 52 and 54 has two sets of coils 50A and 50B, 52A and 52B, 54A and 54B (transformers), respectively. Each transformer couples signals between a twisted-pair link on the ring and a twisted pair link to a workstation. For example, link 58 on ring 46 is coupled to link 3B via transformer 50B. Between each set of coils is a switch (for example, switch 51 between coils 50A and 50B). Switch 51 controls whether signals on ring 46 go through workstation 40 or by-pass workstation 40. The operation of switch 51 is described in detail in U.S. Pat. No. Re. 33,825, entitled "Sub-Milliamp Mechanical Relay."

Duplex converters, or signal exchangers, 60, 62 and 64 are provided between workstations 40, 42 and 44 and terminal boxes 50, 52 and 54, respectively, to exchange the counter-rotating signals between the single ring 46 and transceivers in the workstations. Thus, a counter-clockwise signal transmitted from transceiver 1 passes over links 1T, 1A, 1B, 3R to transceiver 3. Transceiver 3 retransmits the signal over link 3T to links 2A, 2B, and 5R to transceiver 5. Finally, transceiver 5 sends the signal back to transceiver 1 over links 5T, 3A, 3B and 1R. In a similar manner, not including the transceiver links, a clockwise signal from transceiver 6 would pass around the ring via links, 2B, 2A, 1B, 1A, 3B and 3A.

To do this, each converter 60, 62 and 64 has two hybrid transformers 60A and 60B, 62A and 62B, 64A and 64B, connected between each of the transceivers in the workstation and one of the transformers in the terminal box. For example, transceivers 1 and 2 are connected to transformer 50B via hybrid transformer 60B, and are connected to transformer 50A via hybrid transformer 60A. Each of the hybrid transformers operate to superimpose the counter-rotating signals on the link to the terminal box, and to isolate the counter-rotating signals at the communication link for each transceiver.

In converter 60, hybrid transformer 60A passes a counter-clockwise (direction on the ring) signal from transceiver 1 to transformer 50A in terminal box 50. Hybrid transformer 60A also passes a clockwise signal from transformer 50A in terminal box 50 to transceiver 2. While exchanging these clockwise and counter-clockwise signals between the ring and the appropriate transceiver, hybrid transformer 60A blocks the received clockwise signal from reaching transceiver 1, and blocks the transmitted counter-clockwise signal from reaching transceiver 2. To pass signals on selected paths requires impedance balancing of the paths. Adjustable impedance 61 is provided on transformer 60A for this purpose. Each of the hybrid transformers has a similar adjustable impedance for this purpose.

Figure 3:
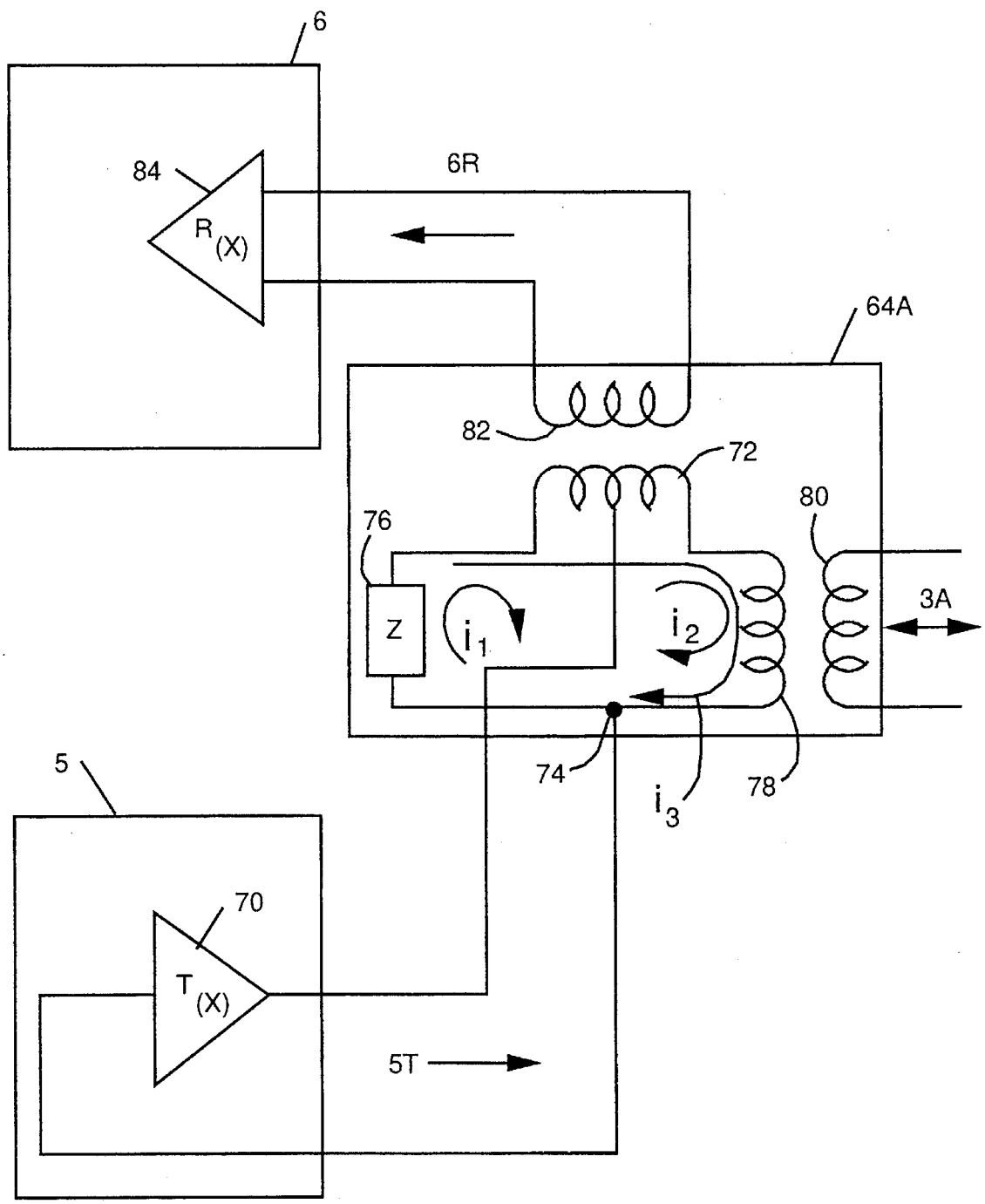
FIG. 3 shows the preferred embodiment of a duplex converter for use in FIG. 2.

The preferred embodiment of a hybrid transformer for the converters of FIG. 2 is shown in FIG. 3. In particular, FIG. 3 illustrates hybrid transformer 64A in FIG. 2; all the other hybrid transformers in FIG. 2 would operate in a similar manner. Hybrid transformer 64A has two superimposed signals on link 3A. One signal is the counter-clockwise transmitted signal from link 5T, and the other is the clockwise received signal destined for link 6R.

The hybrid transformer has two pairs of coils 72, 82, and 78, 80 with the secondary coils 72 and 78 of those pairs connected in series with an impedance element 76 around a closed loop. In operation, transmitter 70 in transceiver 5 sends the counter-clockwise signal over link 5T to the mid-point of coil 72 and to circuit node 74. Impedance of impedance element 76 is adjusted to match the impedance that the transmitted signal sees through coils 78 and 80 out on link 3A. Coils 78 and 80 simply couple signals between converter 64A and link 3A. With the impedance of element 76 matched to the impedance of paired coils 78 and 80, currents i1 and i2 through each half of coil 72 are equal and opposite. Therefore, coil 72 induces equal and opposite currents in coil 82, and receiver 84 does not see the transmitted signal from transmitter 70. Thus, receiver 84 is isolated from signals from transmitter 70.

With regard to the received signal on link 3A, the received signal induces a current i3 in coil 78 that travels through impedance 76 and coil 72. Coil 72 couples the received signal to coil 82, and the received signal passes over link 6R to receiver 84. Transmitter 70 is a high impedance to current i3 so no significant amount of the i3 current passes through transmitter 70. In this way, the received signal is passed to receiver 84, while being isolated from transmitter 70.

There are any number or ways to make the circuit path between transmitter 70 and coil 72 a high impedance path for current i3. Diodes or frequency dependent elements may be used. The hybrid transformer circuit in FIG. 3 is sometimes referred to as an anti-sidetone circuit and, thus, a number of designs for the hybrid transformer circuit 64A and the connections to transmitter 70 and receiver 84 are available to one skilled in the art.

While a number of preferred embodiments of the invention have been shown and described, it will be appreciated by one skilled in the art, that a number of further variations or modifications may be made without departing from the spirit and scope of our invention.

What is claimed is:

1. Apparatus for converting a one-way single-ring communication network into a bi-directional single-ring communication network wherein a single communication link serially connects a plurality of terminal connectors in a closed loop to form said single-ring communication network, comprising:

a plurality N of workstations;

a plurality N of said terminal connectors, each individual one of said terminal connectors connecting an individual one of said workstations to said single-ring network;

a first transceiver in each individual one of said workstations, each of said first transceivers having a first receiver receiving and a first transmitter transmitting communication signals in a counterclockwise direction around said single-ring network;

a second transceiver in each individual one of said workstations, each of said second transceivers having a second receiver receiving and a second transmitter transmitting communication signals in a clockwise direction around said single-ring network;

N first duplex convertors,

N second duplex converters, one first duplex convertor and one second duplex converter being connected between an individual one of the workstations and a terminal connector for that individual workstation, said one first duplex converter being connected between the terminal connector for each individual workstation and the first receiver and the second transmitter for that workstation, said one second duplex converter being connected between the terminal connector for each individual workstation and the second receiver and the first transmitter for that workstation, said one first duplex converter and said one second duplex converter acting together at each individual workstation to superimpose at the terminal connector of that workstation the clockwise and counter-clockwise signals from the first transmitter and second transmitter of that workstation, and said one first duplex converter and said one second duplex converter acting together at each individual workstation to isolate at the first and second receiver of that workstation the counterclockwise signals and the clockwise signals that are respectively received from the second transmitter and the first transmitter of that workstation.

2. The apparatus of claim 1 wherein each of said terminal connectors comprises:

a first connecting link passing communication signals between each of said first duplex converters and a corresponding one of said terminal connectors; and a second connecting link passing communication signals between each of said second duplex converters and said corresponding one of said terminal connectors.

3. The apparatus of claim 2 wherein said first and second duplex converters comprising respectively first and second hybrid transformer circuits: and said first hybrid transformer circuit connected between each of said first receiver and said second transmitter and said first connecting link, said first hybrid transformer circuit isolating from said first receiver clockwise signals from said second transmitter, passing to said first receiver counterclockwise signals from said first connecting link, and passing to said first connecting link clockwise signals from said second transmitter; and said second hybrid transformer circuit connected between each of said first transmitter and second receiver and said second connecting link, said second hybrid transformer circuit isolating from said second receiver counterclockwise signals from said first transmitter, passing to said second receiver clockwise signals from said second connecting link, and passing to said second connecting link counterclockwise signals from said first transmitter.

4. In a computing system having a plurality of workstations that are interconnected on a communication network configured as a single ring, apparatus for converting the single ring from one-way communication into duplex communication, said apparatus comprising:

a terminal means for each workstation, said terminal means being connected in series around the single ring, for superimposing on the single ring clockwise and counterclockwise signals that are received from the workstations;

a first and a second transceiver means at each workstation, said first transceiver means having CCWR (counterclockwise receiving) means for receiving counterclockwise signals from the single ring, and having CCWT (counterclockwise transmitting) means for transmitting signals in a counterclockwise direction around the single ring, said second transceiver means having CWR (clockwise receiving) means for receiving clockwise signals from the single ring, and having CWT (clockwise transmitting) means for transmitting signals in a clockwise direction around the single ring;

a first and a second duplex exchange means for each workstation;

said first duplex transformer means for passing clockwise signals between said CWT means and said terminal means, for passing counterclockwise signals between said CCWR means and said terminal means, and for blocking clockwise signals between said CWT means and said CCWR means; and said second duplex transformer means for passing counterclockwise signals between said CCWT means and said terminal means, for passing clockwise signals between said CWR means and said terminal means, and for blocking counterclockwise signals between said CCWT means and said CWR means.

5. The apparatus of claim 4 wherein each of said first and second duplex exchange means includes two hybrid transformer means, and each of said hybrid transformer means comprises:

a first pair of primary and secondary coils for coupling both the clockwise and counterclockwise communication signals between the primary coil connected to said terminal means and the secondary coil;

a second pair of primary and secondary coils;

said secondary coils of said first and second pairs being connected in series in a closed loop with an impedance element whose impedance is matched to the first pair of coil's effective impedance in the loop;

said second pair for coupling a communication signal between the second pair's primary coil connected to a receiver on one of said CWR and CCWR means and the second pair's secondary coil; and a transmitter of one of said CCWT and CWT means connected between the center tap of the secondary of said second pair of coils and a circuit node between the secondary of said first pair of coils and the impedance element whereby a communication signal transmitted by said CWT and CCWT means induces two equal and opposite signals in the primary of said second pair of coils.

\* \* \* \* \*